US008130686B2

(12) United States Patent
Rao et al.

(10) Patent No.: US 8,130,686 B2
(45) Date of Patent: Mar. 6, 2012

(54) MULTICASTING PUSH-TO-MEDIA CONTENT

(75) Inventors: Roshan M. Rao, Acton, MA (US);
Gopal Harikumar, Westford, MA (US);
Rayadurgam Ravikanth, Acton, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 943 days.

(21) Appl. No.: 11/561,523

(22) Filed: Nov. 20, 2006

(65) Prior Publication Data

US 2008/0119172 A1    May 22, 2008

(51) Int. Cl.
*H04H 20/71* (2008.01)
(52) U.S. Cl. ......... 370/312; 370/389; 370/390; 370/432
(58) Field of Classification Search .................. 370/312, 370/389, 390, 432
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,558,356 B2 | 7/2009 | Pollman et al. |
| 7,558,588 B2 | 7/2009 | To et al. |
| 2002/0196749 A1 | 12/2002 | Eyuboglu et al. |
| 2003/0100311 A1 | 5/2003 | Chung et al. |
| 2005/0213555 A1 | 9/2005 | Eyuboglu et al. |
| 2005/0232241 A1 | 10/2005 | Wu et al. |
| 2005/0243749 A1 | 11/2005 | Mehrabanzad et al. |
| 2005/0245279 A1 | 11/2005 | Mehrabanzad et al. |
| 2006/0034202 A1* | 2/2006 | Kuure et al. .................. 370/312 |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0019645 A1* | 1/2007 | Menon .......................... 370/390 |

(Continued)

FOREIGN PATENT DOCUMENTS

GB    2452688    3/2009

(Continued)

OTHER PUBLICATIONS

International Search Report and Written Opinion from corresponding PCT application No. PCT/2007/85083 mailed Apr. 9, 2008 (10 pages).

(Continued)

*Primary Examiner* — Barry Taylor
(74) *Attorney, Agent, or Firm* — Fish & Richardson P.C.

(57) ABSTRACT

In addition to other aspects disclosed, in response to an attempt by an access terminal in a sector of a wireless network to provide push-to-media content to another access terminal, the push-to-media session content is transmitted from the first access terminal over a multicast flow to the other access terminal.

49 Claims, 4 Drawing Sheets

U.S. PATENT DOCUMENTS

| | | |
|---|---|---|
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0168523 A1* | 7/2007 | Jiang et al. ............. 709/228 |
| 2007/0177555 A1* | 8/2007 | Brueck et al. ............. 370/338 |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'Ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2010/0182944 A1* | 7/2010 | Kish ............. 370/312 |

FOREIGN PATENT DOCUMENTS

| | | |
|---|---|---|
| GB | 2457189 | 8/2009 |
| WO | WO2008/064149 | 5/2008 |

OTHER PUBLICATIONS

International Preliminary Report on Patentability of PCT application No. PCT/US2007/085083 mailed Jun. 4, 2009 (7 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

Examination Report from corresponding United Kingdom application No. 0908953.3, dated Oct. 4, 2010 (2 pages).

Response to Examination Report dated Oct. 4, 2010 from corresponding United Kingdom application No. 0908953.3, filed Mar. 14, 2011 (20 pages).

* cited by examiner

MULTICASTING PUSH-TO-MEDIA CONTENT

BACKGROUND

This description relates to multicasting push-to-media content.

A Push-To-Media (PTM) features such as Push-To-Talk (PTT) service and Push-To-Video (PTV) service allows mobile phones to be operated as digital two-way radios for sending audio and video content. By pressing and holding a button, a user can talk while one or more other users listen. Similarly, pressing the same (or a different) button a stream of video may be sent for viewing by other users. PTM connects mobile phones with each other within a relatively short period (e.g., a few seconds) and bypasses the time delay needed for dialing to set up a normal phone call. By pressing and depressing the button, a phone can be switched between transmitting and receiving PTM content in a half-duplex manner.

PTM may be implemented to operate over a realization of an EV-DO Rev A standard (also written as 1×EV-DO Rev A or 1× Evolution-Data Optimized Revision A) or another similarly capable standard. EV-DO Rev A is included in a family of standards that are promoted by the Third Generation Partnership Project 2 (3GPP2), a collaborative Third Generation (3G) telecommunications specification-setting project associated with the development of the next generation Code Division Multiple Access (CDMA) wireless communications.

The 1×EV-DO protocol is an EVolution of the 1×RTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, which is also incorporated herein by reference.

When placing a PTM call, a series of setup-messages are sent between the user's handset (also referred to as an Access Terminal or AT) and structures included in a Radio Access Network (RAN). These structures include Radio Nodes (RNs) and Radio Network Controllers (RNCs), which act as a link between the wireless devices (e.g. AT) and a PTM server that sets up a PTM call.

When the PTM button is pressed on the AT to establish a connection, a message is sent from the AT to the PTM server. The PTM server, which stores a database that includes Internet Protocol (IP) addresses of potential target ATs, forwards a connection request to the desired target AT. Typically, this request is routed via IP routing, a packet data serving node (PDSN) and the RAN.

The number of listeners/viewers in a PTM session may be one or many. For one listener/viewer, the call is referred to as a point-to-point call, while for more than one, the call is referred to as a point-to-multipoint call. For each target AT, an individual data flow (also referred to as a unicast) is established with the RAN. Audio/Video content to be provided during the PTM session is replicated and provided to each unicast flow for delivery to a corresponding target AT.

SUMMARY

In general, in some aspects of the invention, in response to an attempt by an access terminal in a sector of a wireless network to provide push-to-media content to another access terminal, the push-to-media content is transmitted from the first access terminal using a flow to the other access terminal. The flow is capable of transmitting the push-to-media content to at least two access terminals. The flow may include a multicast flow, a flow that conforms to a published standard, or a Broadcast and Multicast Services (BCMCS) flow. The push-to-media content may also be transmitted using a unicast flow to still another access terminal. Transmission of the push-to-media content may be based upon a characteristic of the second access terminal such as the location of the second access terminal, operational capability of one of the access terminals, a subscription service associated with one of the access terminals, the access terminal being a member of a group, or other similar event.

Adjustments access may be made to the flow that include granting access or removing access from one or more access terminals. The push-to-media content may include push-to-talk content or other types of content. The flow may be switched to a unicast flow based upon a status change of one of the access terminals. This status change may include a decrease in membership of an access terminal group, a location change of one of the access terminals, or other similar event. The unicast flow may also be switched back to a second flow that is capable of transmitting the push-to-media content to at lest two access terminals. Returning to this flow may be based upon a status change of one of the access terminals. For example, the status change may include an increase in membership of an access terminal group.

In some aspects of the invention, a system is disclosed that includes a server that determines if establishing a flow capable of transmitting push-to-media content to at least two access terminals would be warranted. The system also includes a controller that initiates production the flow based upon the determination by the server. The flow includes the push-to-media session content. The flow may include a multicast flow, a flow that conforms to a published standard, or a Broadcast and Multicast Services (BCMCS) flow. The system may also include a packet data serving node that initiates a unicast flow based upon the determination by the server. The system may further include an access terminal that accesses the flow for sending or receiving the push-to-media session content. Access to the flow may be based upon a characteristic of the access terminal such as the location of the access terminal, an operational capability of the access terminal, a subscription service associated with the access terminal, the access terminal being a member of a group, or other similar event.

The push-to-media content may include push-to-talk content or other similar content. The controller may also initiate a unicast flow, which includes the push-to-media content, based upon the determination by the server. A status changes of an access terminal may initiate the flow to be switched to the unicast flow. The access terminal includes a cellular phone, a computing device, or other similar device.

In some aspects of the invention, a medium bears instructions to cause a machine to, in response to an attempt by an access terminal in a sector of a wireless network to provide push-to-media content to another access terminal, transmit the push-to-media content from the first access terminal using a flow to the other access terminal. The flow is capable of transmitting the push-to-media content to at least two access terminals. The flow may include a multicast flow, a flow that conforms to a published standard, or a Broadcast and Multicast Services (BCMCS) flow. The push-to-media content may also be provided using a unicast flow to still another access terminal. Transmission of the push-to-media content may be based a characteristic of one or the access terminals such as the location of the second access terminal, operational capability of one of the access terminals, a subscription service associated with one of the access terminals, membership of an access terminal group, or other similar event.

The push-to-media content may include push-to-talk content or other types of content. The flow may be switched to a unicast flow based upon a status change of one of the access terminals. This status change may include a decrease in membership of an access terminal group, e.g., due to a location change of one of the access terminals. The unicast flow may also be switched back to a second flow capable of transmitting the push-to-media content to at least two access terminals. Returning to this type of flow may be based upon a status change of one of the access terminals. For example, the status change may include an increase in membership of an access terminal group.

In some aspects of the invention, a system is disclosed that includes a server that determines if establishing a Broadcast and Multicast Services (BCMCS) flow or a unicast flow would be warranted. The BCMCS flow and the unicast flows are capable of transmitting push-to-media content. The system also includes a controller to initiate the BCMCS flow or the unicast flow based upon the determination by the server. The initiated flow includes the push-to-media content.

Access to the initiated flow may be based upon a characteristic of an access terminal to receive the flow. A status change of the access terminal may initiate the BCMCS flow to switch to the unicast flow or the unicast flow to switch to the BCMCS flow.

Among the advantages of the techniques described here are one or more of the following.

Because PTM services are provided over channels included in a multicast flow such as a Broadcast and Multicast Services (BCMCS) flow, more ATs may be targeted to receive and provide PTM content. A significant number of ATs may simultaneously access the multicast flow, thereby providing an efficient technique to conserve bandwidth when multiple AT users are interested in the same content.

By allowing PTM content to be simultaneously accessible by multiple ATs, content may be sent without replicating the content for transmission over a dedicated unicast flow for each recipient AT.

Other features and advantages will be apparent from the description and the claims.

DESCRIPTION

Figure 1:
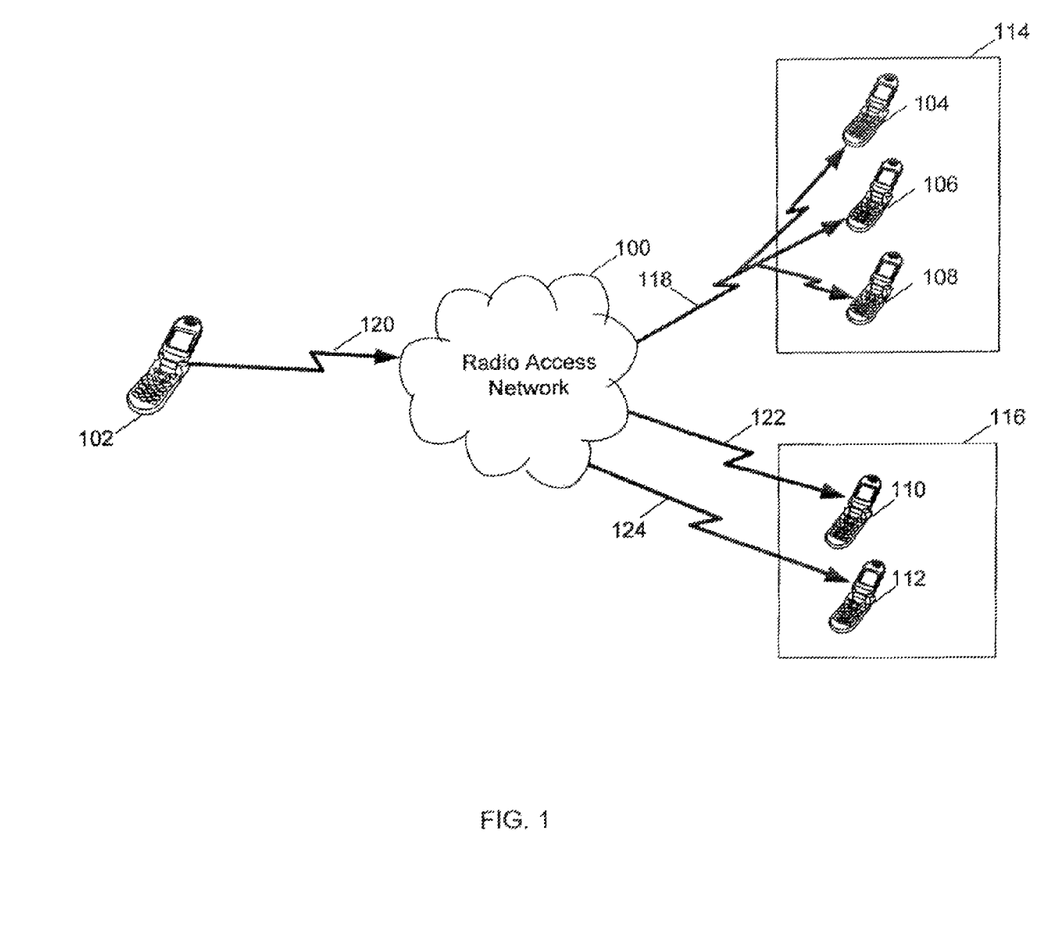
FIG. 1 is a diagram of a Radio Access Network.

Referring to FIG. 1, in some embodiments, a mobile phone user may wish to provide PTM content (e.g., audio, video, data, etc.) to one or multiple other mobile phone users. One or more of the recipients may respond by providing PTM content to the mobile phone user who initiated the PTM session or to other mobile phone users. To provide wireless trafficking of the PTM content, a RAN 100 establishes wireless links with each respective mobile phone 102, 104, 106, 108, 110 and 112.

For example, the user of mobile phone 102 may wish to use a PTM service and may initiate the service by pressing a button on the mobile phone to execute a PTM application (not shown). Mobile phone 102, also referred to as the caller AT 102, sends PTM content to RAN 100 for delivery to one or more target mobile phones (also referred to as target ATs). Besides mobile phones, one or more of the ATs may be implemented as a PDA, a computer system (e.g., a laptop computer), or other type of digital handset that supports a protocol such as the 1×EV-DO protocol.

Since the ATs may be moved about, the ATs may be scattered across relatively large areas. Based upon the coverage provided by RAN 100, some of the ATs may be considered grouped together. For example, common antenna coverage may allow ATs 104, 106 and 108 to be grouped into one sector 114. Due to coverage provided by other antennas, ATs 110 and 112 may be grouped in another sector 116.

Besides forming sectors based on geographic location, other metrics may be used for grouping ATs. For example, AT operational capability may be used for assigning group membership. ATs capable of accessing a multicast flow may be placed in one group while ATs not supporting multicast flows may be placed in one or more other groups. For example, earlier model ATs (e.g., older model mobile phones) may lack circuitry and/or operational functionality to access a multicast flow and should be grouped with other ATs that may not support multicast flows.

Business rules may also be used to define AT groups to be provided access to a multicast flow and groups denied access to a multicast flow. For example, multicast flow subscribers that are current with subscription payments may be placed in a group that is provided multicast access while delinquent subscribers or non-subscribers may be placed in a group denied access to multicast flows. Alternatively, the ATs of the delinquent subscribers may only be provided access to a unicast to participate in a PTM session. Group membership may also be established by combinations of rules. For example, ATs present in a particular location (e.g., Boston, Mass.) that are owned by paid up subscribers may be provided multicast flow access. Meanwhile, ATs in other locations (e.g., Marlboro, Mass.) whose subscribers are delinquent may be placed in a group denied multicast services. Other similar types of rules and constraints may be used individually or in combination to define groups granted access to multicast flows and groups constrained to unicast flows. For example, a particular number of closely located ATs that meet or exceed a predefined threshold may be formed into a multicast flow accessible group. If the number of ATs is less than the threshold value, the ATs may be placed a group in which each member may access a dedicated unicast flow.

AT groups may also be established by the AT initiating the PTM session. For example, an initiating AT may store a list of other ATs (e.g., a buddy list). From the list, group members may be selected that are granted access to a multicast flow. Similarly, group members may be selected for establishing corresponding unicast flows. Geographic location, business rules, or other types of constraints may also be used with a buddy list to define group membership.

For illustrative purposes, ATs 104, 106 and 108 grouped in sector 114 are provided access to one or more multicast flows. Alternatively, ATs 110 and 112 are grouped into sector 116 are denied access to multicast flows. For example, by meeting a threshold of three ATs in relatively close proximity, the multicast-accessible AT group in sector 114 may be established. Once established and recognized by RAN 100, each AT may access a multicast flow 118 that is provided by RAN 100. By not meeting or exceeding the threshold (e.g., of three ATs), ATs 110 and 112 grouped in sector 116 are denied access to multicast flows. However, ATs 110 and 112 are not completely denied access to PTM session content (e.g., being provided by AT 102 via a wireless link 120 to RAN 100). To provide the PTM content (and potentially receive responsive PTM content), RAN 100 establishes respective unicast flows 122 and 124 with the ATs 110 and 112. Generally, unicast flows 122 and 124 lack the efficient bandwidth management.

As we use it, the term flow represents a content stream being exchanged between a sender and a receiver. The term multicast includes any communication technique in which data is sent using one transmission stream to a select group of recipients. Examples of multicast flows that may be established by RAN 100 include a 3GPP2 Broadcast and Multicast Services (BCMCS) multicast flow may be established for providing PTM content. In general, BCMCS is a multicast flow for CDMA (e.g., CDMA2000) networks that implement a flexible common radio channel suitable for point-to-multipoint and broadcast traffic. As with other types of multicast flows, BCMCS provides the benefit of multicast and broadcast in which many ATs can access a common channel. By receiving data from a common channel, data sets are not replicated for transmission over multiple unicast flows that are respectively assigned to individual ATs. As we use it, the term unicast includes any communication technique in which data is sent to each recipient using a dedicated transmission stream.

Figure 2:
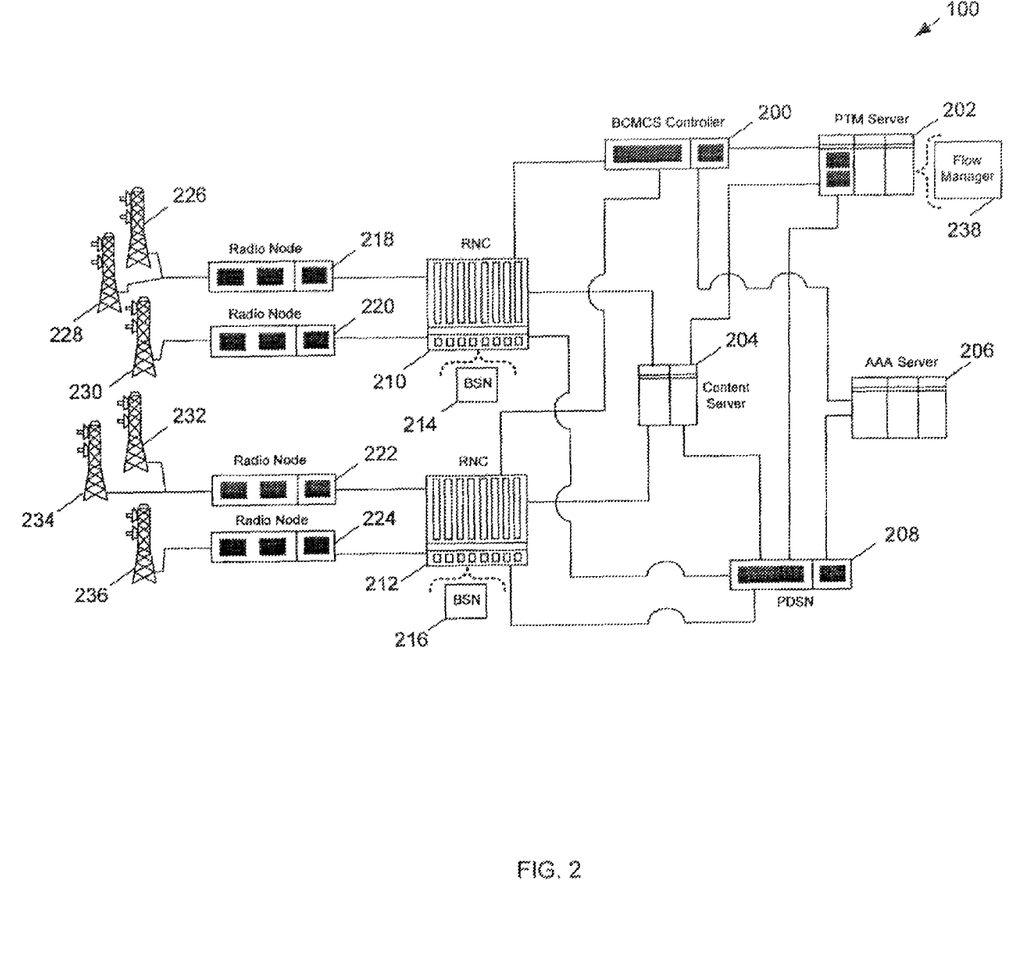
FIG. 2 is a block diagram of components included in a Radio Access Network.

Referring to FIG. 2, an exemplary embodiment of RAN 100 is presented that supports PTM services being provided over one or more multicast flows such as BCMCS flows. To provide PTM services over multicast flows and unicast flows, RAN 100 includes BCMCS controller 200, a PTM server 202, a content server 204, an authentication, authorization, and accounting (AAA) server 206 and a packet data serving node (PDSN) 208. To send and receive signals from the ATs, RAN 100 typically includes RNs and RNCs. In general, an RNC communicates (e.g., over an IP network referred to as a backhaul network) with one or more assigned RNs. Each RN may serve multiple geographical areas (e.g., sectors) and communicates with ATs within the areas. In some arrangements, one or more RNCs may include one or multiple system controller (SC) cards, of which, one or more may be active during particular time periods. An RNC may include, e.g., four input/output (I/O) cards such as basic input/output (BIO) cards. The I/O cards may provide connectivity for numerous (e.g., eight) Radio Network Service Module (RNSM) cards, which may implement the 1×EV-DO functionality. For illustration, RAN 100 includes two RNCs 210, 212, however, more RNCs may be included in the RAN. To establish multicast flows (e.g., to provide PTM services) and provide other functionality, the RNCs 210 and 212 each execute respective Broadcast Serving Node (BSN) processes 214, 216. Both RNCs 210 and 212 are respectively connected RNs 218, 220, 222 and 224 that are respectively connected to one or more antenna systems 226, 228, 230, 232, 234 and 236 to transmit and receive content.

Generally, BCMCS Controller 200 may be configured to arrange multicast flows of multimedia content such as PTM content. For example, BCMCS Controller 200 may be used to define program names along with start and end times for multicast flows. Bandwidth requirements, addressing information, header compression information, quality of service (QOS)/bit error rate levels, and geographical localization of flows may be defined by BCMCS controller 200 along with other parameters. Multicast flow processing directives such as compression and encryption techniques may be provided by BCMCS controller 200. BCMCS controller 200 may also provide flow parameters to content server 204 (and the respective BSN processes 214 and 216 executed by RNC 210 and RNC 212) and to other components of RAN 100. Other operations provided by BCMCS controller 200 may include authentication of the ATs along with providing the ATs with encryption and decryption data (e.g., encryption keys, etc.).

BSN processes 214, 216 may establish pathways for multicast flows within RAN 100 (e.g., assigning pathways for particular multicast groups, initiating broadcast channels at appropriate times, etc.) while Content Server 204 may initiate and control content streaming to the BSN processes at scheduled times. Additionally, BSN processes 214 and 216 may provide operations such as preparing content (e.g., attaching Point-to-Point Protocol (PPP) headers, attaching Frame Check Sequence (FCS) trailers, etc.) for transmission to one or more ATs. BSN processes 214 and 216 may assure that the multicast flows comply with protocols such as the Broadcast Framing Protocol, the Broadcast Security Protocol and the Broadcast MAC Protocol, for example. Furthermore, BSN processes 214 and 216 may apply one or more error detecting techniques (e.g., Reed-Solomon Error-detection coding) to the multicast flows and manage the broadcast channels included in the flows.

At an appropriate time (e.g., defined by BCMCS controller 200), Content Server 204 initiates content streaming to one or both of the RNCs 210 and 212. Upon receipt, the BSN processes 214 and 216 may perform multicast framing (e.g., BCMCS framing), error-correction preparation (e.g., addition of error-correction bits, etc.) and send the multicast flow to one or more appropriate RNs (e.g., RN 214) for transmission, e.g., over a Broadcast Channel. Along with broadcasting the multicast flow content, periodic overhead messages may be broadcast over a channel (referred to as a Control Channel). The overhead messages may, for example, include information for granting one or more ATs access to particular types of data such as high-layer data packets.

Each individual AT may also communicate with BCMCS Controller 200 (via an antenna, an RN and an RNC) to obtain information associated with one or more flows (e.g., a multicast flow, a unicast flow, etc.). For example, encryption keys, flow identification data (e.g., flowID data), address data (e.g., multicast address mappings information), compression data (e.g., header compression (ROHC) parameters), decryption data, etc., may be provided for accessing higher-layer packets for content delivery to one or more AT applications.

PTM Server 202 may be implemented as one or more server types (e.g., a Session Initiated Protocol (SIP) server). PTM Server 202 provides numerous services such as database services for PTM operations. AT Registration may be initiated when a PTM-enabled AT is powered on, or if a PTM application is executed and IP connectivity is obtained, or by execution of another similar event. By registering, the PTM Server 202 is provided information that may be used to establish one or more pathways through the RAN 100 for directing data to the AT. For example, IP Addresses (e.g., 162.1.2.3) respectfully assigned to each AT may be collected by PTM server 202. Once registered, an AT may be provided PTM services that may include transmitting PTM content and receiving PTM content over a multicast flow.

PTM server 202 may also collect data associated a previously registered AT. Data such as the current location of each registered AT along with the data representing the AT type (e.g., model type, serial number, manufacturer information, etc.) may be collected by the PTM server 202. By registering the ATs and collecting AT data, the PTM server 202 may assist the BCMCS Controller 200 in identifying and forming AT groups based upon one or more predefined constraints (e.g., sector location, AT capability, business rules, buddy lists, etc.). The PTM server 202 may also provide registration services.

To initiate a PTM session, e.g., for sending voice or video content to one or more ATs, a caller AT (e.g., AT 102) sends an invitation message (e.g., a SIP INVITE message) to PTM Server 202 via a corresponding antenna, RN, RNC and PDSN. In some arrangements, an invitation message may contain information that identifies the content type (e.g., voice, video, data, etc.) to be passed during the PTM session. The invitation may also include data that represents the identity of one or more potential PTM session participants (e.g., the caller AT, one or more target ATs, etc.). After authenticating the identity of the caller AT and verifying authorization for PTM services, PTM Server 202 attempts to forward the invitation message (e.g., the SIP INVITE message) to the target ATs that may be included in the session. In some arrangements, to receive an invitation message, a target AT needs to be registered with PTM Server 202. Upon receiving the invitation message, a reply may be sent from a target AT to accept or decline participation in the session. Along with PTM Server 202, typically the reply message is also provided to the caller AT. If one or more recipients accepts the offer to join a session, the caller AT may initiate sending PTM content.

In some conventional systems, only a unicast is used to provide PTM content between a caller AT and each target AT. Since each dedicated unicast flow includes PTM content, content is replicated for each flow. By replicating the PTM content for each unicast flow, computational resources and time may be substantially consumed. Furthermore, for "N" unicast flows (each with a flow bandwidth of "B"), a total bandwidth of N*B is consumed to establish streams for a point-to-multipoint session. Thus, along with a need for computational resources to replicate PTM content, significant bandwidth, which may increase linearly with the number of unicast flows, may be consumed.

By providing PTM content via a multicast flow, bandwidth along with computational needs may be reduced. For example, multiple ATs may access a single multicast flow, thereby reducing bandwidth (compared to multiple unicast flows) along with the need for replicating PTM content.

In some scenarios, a multicast flow may provide an efficient technique for sending PTM content to a particular geographical sector. For example, a multicast flow may be provided to a particular geographical sector if a predetermined number of ATs are present in the sector. Alternatively or in conjunction with meeting or exceeding a particular number of ATs, business rules, equipment type, capabilities, buddy lists, etc. may be used in determining whether to provide a multicast flow to ATs located in a sector. If determined that providing a multicast is not justified for a particular sector, a dedicated unicast flow may be established with each of the ATs located in the sector.

A Flow Manager 238 may be executed by PTM server 202 for determining if one or more multicast flows may be used to provide PTM content to the ATs. Additionally, Flow Manager 238 may assist in identifying which ATs may access a multicast flow and which ATs should be provided PTM content via a unicast. For example, based in part by the location of each AT, a multicast flow may be provided to a geographic region (e.g., a sector) that includes a large population of ATs capable of accessing a multicast flow. In regions with a relatively small population, Flow Manager 238 may determine to establish unicast flows, if feasible.

Figure 3:
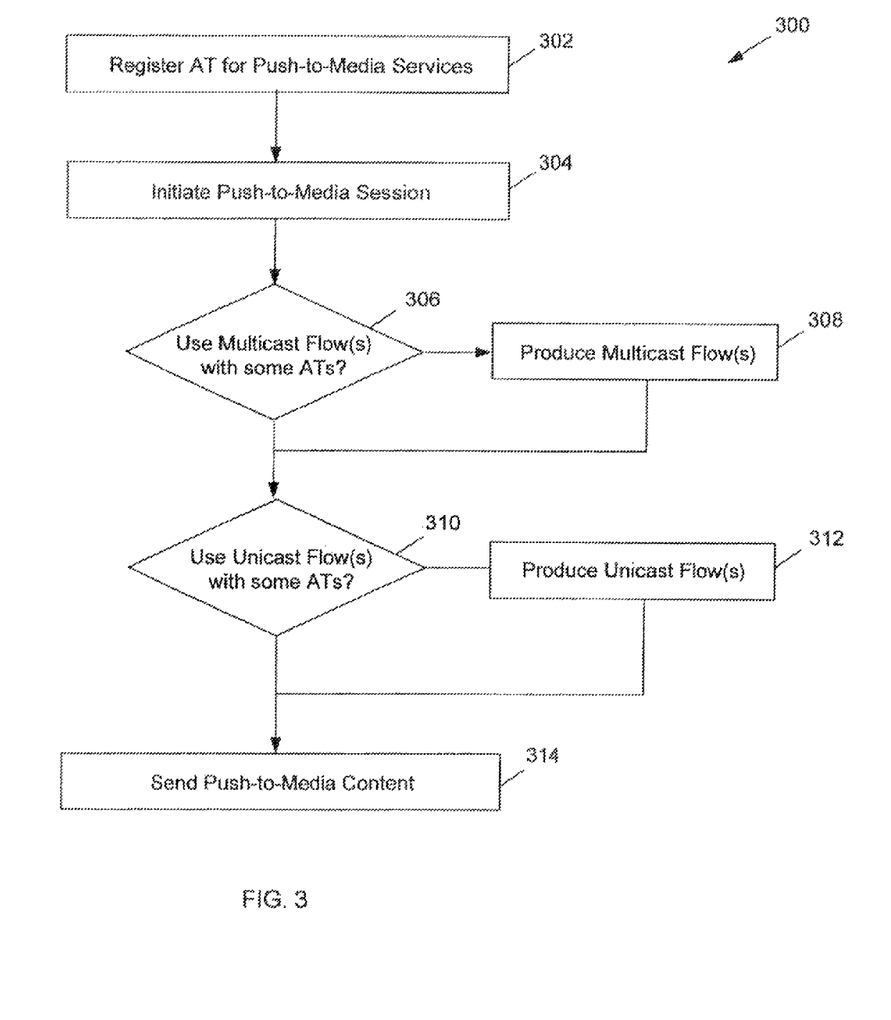
FIG. 3 is a flow chart of operations executed by a flow manager.

Referring to FIG. 3, a flowchart 300 that represents some of the operations of Flow Manager 238 is shown. As mentioned above, Flow Manager 238 may be executed by PTM server 202 or one or more other computation devices. Some operations may include establishing groups of ATs such as ATs 102, 104, 106, 108, 110 and 112 (shown in FIG. 1). These groups may be formed based upon location, business rules, or other methodologies such as operation capabilities of the ATs and buddy lists stored in one or more ATs. Along with assigning a unique name (e.g., a username) to each group member, each group may be assigned a name. For example, a name may be assigned to the ATs 104, 106 and 108 grouped in sector 114, and another name may be assigned to the ATs 110 and 112 grouped in sector 116.

Operations of Flow Manager 238 may include registering 302 each AT (e.g., AT 102), in communication with the RAN 100, with PTM Server 202. Registration may be initiated by powering on an AT and establishing an IP connection with the RAN 100 (e.g., a 1×EV-DO connection). Registration 302 may also be initiated by executing a PTM application at a respective AT or other similar event. In some arrangements, an executed PTM application may initiate registration by sending a Session Initiation Protocol (SIP) registration message to the PTM Server 202. In one exemplary message, the IP address of the AT may be included along with a list of AT capabilities e.g., data representing whether the AT can receive packets from a multicast flow.

Operations may also include initiating 304 a PTM session. For example, a SIP Invitation message may be sent from a caller AT (e.g., AT 102) to PTM Server 202 for initiating a PTM session. A SIP registration message may be used to invite target ATs to a unicast flow or multicast flow session. Generally, SIP supports name mapping and redirection services, thereby the caller may initiate and receive communications and services from any location. The SIP invitation also includes data (e.g., group name, group member name, etc.) that identifies the target ATs to be invited. For example, individual ATs not included in a group, groups of ATs, or individual group members may be attained from one or more buddy lists and inserted in a SIP invitation to identify target ATs.

The invitation may also identify the type of content (e.g., video, audio, data, etc.) to be passed about during the session. Data that represents the location of the caller AT (e.g., latitude and longitude data) or other type of geographical co-ordinates may be included in the invitation along with data that identifies the one or more RNs in communication with the AT. In some arrangements, the location information is in the form of a Session Description Protocol (SDP) Attribute. Upon receiving the information (e.g., location, group name, group member name, etc.), the PTM Server 202 may store this information for retrieval at a later time for additional processing. If one or more of the target ATs are not identifiable, a message may be sent to alert the initiating AT of their absence or as being unidentified.

Upon receiving the invitations, each target AT (e.g., cell phone 104, 106, 108, 110 and 112) may respond to accept or decline the invitation. For example, to accept session participation, a message that includes an SIP Acknowledgement may be sent to PTM Server 202, which is then forwarded to the caller AT (e.g., AT 102). Information such as location information may also be provided in an acknowledgement message such that the location of each participant target AT may be tracked.

Once the acknowledgments have been received, the PTM Server 202 may send a signal or message to the caller AT to indicate that PTM content may be provided by the AT for transmission to the target AT(s).

Operations may also include determining 306 if one or more of the ATs (e.g., caller AT, target AT, etc.) are capable of accessing a multicast flow (e.g., a BCMCS flow) during the PTM session. Information provided to PTM Server 202 such as location information, individual AT capabilities, business rules, buddy lists, etc. may be used for this determination. As illustrated in FIG. 1, the ATs 104-108 included in sector 114 may access the multicast flow 118 since the number of ATs in the sector 114 exceeds a predefined threshold (e.g., three or more ATs). Alternatively, the two ATs (e.g., ATs 110 and 112) included in sector 116 do not meet the predefined threshold and may not be provided a multicast flow. Operations may include, if justified, producing 308 one or more multicast flows (e.g., BCMCS flows). For example, a SIP invitation may be sent from the PTM server 202 to the BCMCS controller 200 to initiate a flow establishment request. The SIP invitation may include information such as requested bandwidth, a suggested session duration time, the geographical location(s) of the target ATs (and associated RNCs and RNs) that may access a multicast flow, etc. Along with the information provided by PTM Server 202, the BCMCS controller 200 may use other information such as the availability of resources in one or both of the BSN processes 214 and 216 and the configuration of the components included in the RAN 100. In some arrangements one or more multicast flows are established to continuously provide PTM services, and thereby reduce delay caused by flow establishment.

To establish a multicast flow, the BCMCS controller 200 typically sends one or more commands (and data) to the appropriate BSN process (e.g., BSN 214). For example, along with commands to initiate a multicast flow, geographical data associated with each RN may be provided to the BSN process for determining the appropriate path through the RAN 100 for establishing the multicast flow. Upon a multicast flow being established, the BCMCS Controller 200 may send a response to alert the PTM Server 202 of the successful establishment of the flow. This response may include information such as an address assigned to the Content Server 204 so that PTM Server 202 may provide PTM content to the address for multicast flow production. Additionally, the BCMCS Controller 200 may provide information associated with a multicast flow (e.g., BCMCS Flow ID) and data that identifies a particular port of Content Server 204 in which to provide the PTM content. The PTM Server 202 may send update messages (e.g., SIP UPDATE messages), to one or more of the target ATs, which include parameters associated with the multicast flow (e.g., BCMCS flow). For example, multicast-capable ATs may use BCMCS Information Acquisition techniques to communicate with the BCMCS Controller 200 to receive flow identification information (e.g., flowID mappings), compression parameters (e.g., Robust Header Compression (ROHC)) and encryption and decryption keys. However, in some arrangements, compression and encryption techniques may not be implemented, thereby encryption and decryption keys may not be needed.

Operations of Flow Manager 238 may also include determining 310 whether one or more unicast flows should be established for ATs that do not support a multicast flow. For example, if a particular AT (e.g., AT 110) is incapable of supporting a multicast flow or not granted access to a multicast flow, a unicast flow may be established to allow the AT to participate in a PTM session. In some arrangements, the BCMCS Controller 200 (with or without assistance from BSN process 214 and/or 216) may determine if one or more unicast flows are needed. The BCMCS Controller 200 may alert the PTM Server 202 that unicast flows are needed to provide the PTM content to one or more ATs. Operations may also include establishing 312 one or more unicast flows for ATs that may not support a multicast flow. Typically, the PDSN 208 establishes the unicast flows and passes the PTM content from the PTM Server 202 to the ATs.

Once the appropriate multicast flow(s) and unicast flow(s) have been established, operations may include sending 314 PTM content over the one or more established flows. Typically, to provide PTM content over an established multicast flow, the PTM Server 202 provides PTM content (that may or may not be provided by an AT) to Content Server 204 for sending to one or more appropriate RNCs and RNs. For example, content from AT 102 may be received by RN 218, provided to RNC 210 and then to the BCMCS Controller 200 which in turn provides the content to the PTM Server 202. The Content Server 204 may receive the PTM content from the PTM Server 202 and provide it over one or more pathways (using the RNCs and RNs) to one or more target ATs.

Figure 4:
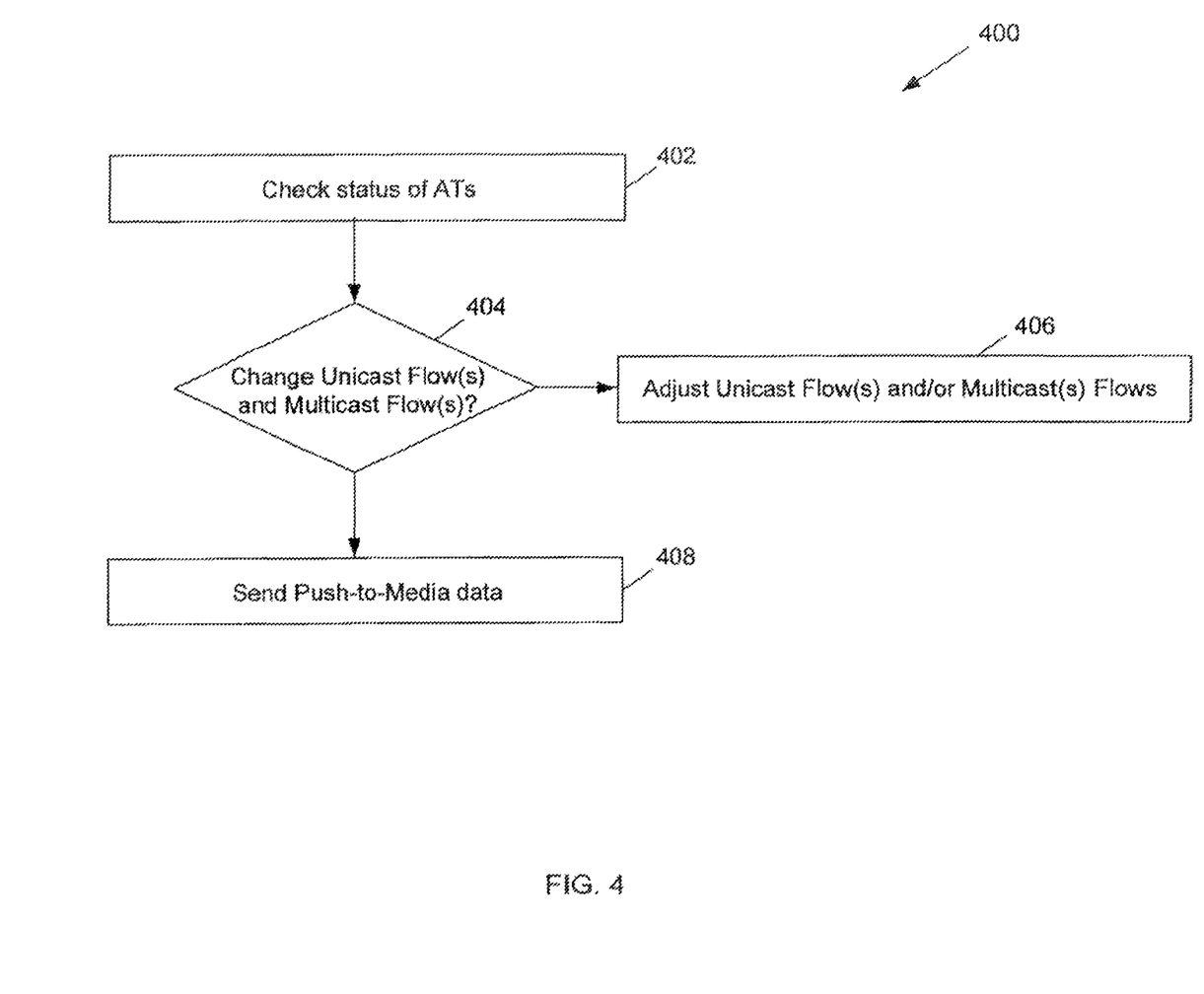
FIG. 4 is a flow chart of operations executed by a flow manager.

Referring to FIG. 4, a flow chart 400 that represents other operations of Flow Manager 238 such as operations to adjust a provided flow is shown. For example, operations may include checking 402 the status of one or more ATs associated with a multicast or unicast flow. Status changes may be associated with one or more events. For example, based on a location change, an AT (e.g., AT 110) may now be capable of supporting a multicast flow such as a BCMCS flow. Renewed subscriptions, adjustments to business rules, equipment upgrades, being entered into a buddy list or other types of events may cause an AT to support (or not support) a multicast flow. An increase or decrease in group membership may also change the status of one or more ATs. For example, if one or more target ATs enter the sector 116, ATs 110 and 112 may be granted access to a multicast flow. Alternatively, if one or more of the ATs (e.g., AT 104) in sector 114 depart from the area, unicast flows may need to be established with the remaining ATs (e.g., ATs 106 and 108). Status checking may implement one or more techniques. For example, each AT may be checked in a serial fashion or in parallel with other ATs. AT status may also be checked based upon the location (e.g., included in a particular sector) or upon one or more other methodology to distinguish ATs (e.g., AT identification number, etc.).

Upon checking the status of the ATs, operations may include determining 404 whether to change one or more unicast flows and/or multicast flows. If a change is warranted, adjustments 406 may be made to one or more of the unicast and/or multicast flows. For example, to switch from a multicast flow to a unicast flow, a command (e.g., a SIP Update command) may be sent from the PTM Server 202 to one or more ATs as an alert to prepare to switch from a passing PTM content via a multicast flow to via a unicast flow. Similarly, a command may be sent for switching from passing PTM content via a unicast flow to via a multicast flow.

A predefined multicast flow duration limit may also trigger a transition from a multicast flow to a unicast flow. For example, as the duration limit is approached, the PTM Server 202 may sent a duration extension request (e.g., a SIP UPDATE command) to the BCMCS Controller 200. If the BCMCS Controller 200 determines that resources are available, the controller may reply by granting the extension. Alternatively, if the resources are not available, the multicast flow may be terminated and one or more unicast flows may be established to provide the PTM content. Once adjustments are complete or determined not to be needed, PTM content is passed 408 among the ATs.

In some embodiments one or more processors may execute instructions to perform the operations of Flow Manager 238, e.g., represented in flowcharts 300 and 400. For example, one or more general processors (e.g., a microprocessor) and/or one or more specialized devices (e.g., an application specific integrated circuit (ASIC), etc.) may execute instructions. One or more of the processors may be implemented in a single integrated circuit as a monolithic structure or in a distributed structure. In some embodiments the instructions that are executed by the processors may reside in a memory (e.g., random access memory (RAM), read-only memory (ROM), static RAM (SRAM), etc.). The instructions may also be stored on one or more mass storage devices (e.g., magnetic, magneto-optical disks, or optical disks, etc.).

One or more of the operations associated with the Flow Manager 238 may be performed by one or more programmable processors (e.g., a microprocessor, an ASCI, etc.) executing a computer program. The execution of one or more computer programs may include operating on input data (e.g., data provided from a source external to RAN 100, etc.) and generating output (e.g., sending data to a destination external to the RAN 100, etc.). The operations may also be performed by a processor implemented as special purpose logic circuitry (e.g., an FPGA (field programmable gate array), an ASIC (application-specific integrated circuit), etc.).

Operation execution may also be executed by digital electronic circuitry, or in computer hardware, firmware, software, or in combinations of them. The operations described in flowcharts 300 and 400 (along with other operations of the Flow Manager 238) may be implemented as a computer program product, e.g., a computer program tangibly embodied e.g., in a machine-readable storage device (e.g., RAM, ROM, hard-drive, CD-ROM, etc.). The computer program product may be executed by or control the operation of, data processing apparatus, e.g., a programmable processor, a computer, or multiple computers. A computer program may be written in one or more forms of programming languages, including compiled or interpreted languages, and it can be deployed in any form, including as a stand-alone program or as a module, component, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network.

Other embodiments are within the scope of the following claims.

What is claimed is:

1. A method comprising:
in response to an attempt by a first access terminal in a sector of a wireless network to provide push-to-media content to a second access terminal, transmitting the push-to-media content from the first access terminal using a flow to the second access terminal in which the flow is capable of transmitting the push-to-media content to at least two access terminals, the push-to-media content transmission is based, at least in part, on information provided by a push-to-media server and represents operational capability of the second access terminal, wherein a multicast controller, different from the push-to-media server, identifies the flow to the first and second access terminals; and
switching the flow to a unicast flow as determined by the push-to-media server based, at least in part, upon a status change of the second access terminal, wherein the status change is associated with a predefined flow duration limit, the push-to-media server is capable of extending the predefined duration limit by sending a duration extension request to the multicast controller.

2. The method of claim 1 wherein the flow comprises a multicast flow.

3. The method of claim 1 wherein the flow conforms to a published standard.

4. The method of claim 1 wherein the flow comprises a Broadcast and Multicast Services (BCMCS) flow.

5. The method of claim 1 further comprising:
transmitting the push-to-media content from the first access terminal using a unicast flow to a third access terminal.

6. The method of claim 1 wherein transmitting the push-to-media content is based, at least in part, upon a characteristic of the second access terminal.

7. The method of claim 6 in which the characteristic of the second access terminal comprises its location.

8. The method of claim 6 wherein the characteristic of the second access terminal comprises an association of the second access terminal with a subscription service.

9. The method of claim 6 in which the characteristic of the second access terminal comprises the second access terminal being a member of a group.

10. The method of claim 1 further comprising:
adjusting access to the flow.

11. The method of claim 10 in which adjusting access to the flow comprises:
granting access to the flow for a third access terminal.

12. The method of claim 10 in which adjusting access to the flow comprises:
removing access of the second access terminal to the flow.

13. The method of claim 1 wherein the push-to-media content includes push-to-talk content.

14. The method of claim 1 wherein the status change includes a decrease in membership of an access terminal group.

15. The method of claim 1 wherein the status change includes a location change of the second access terminal.

16. The method of claim 1 further comprising:
switching the unicast flow to a second flow capable of transmitting the push-to-media content to at least two access terminals based, at least in part, upon a status change of the second access terminal.

17. The method of claim 16 wherein the status change includes an increase in membership of an access terminal group.

18. A system comprising:
a server to determine if establishing a flow capable of transmitting push-to-media content to at least two access terminals would be warranted, based, at least in part, on information stored on the server and represents capability of the at least two access terminals, and
a multicast controller to initiate the flow based upon the determination by the server, wherein the flow includes the push-to-media content, wherein the multicast controller identifies the flow to the at least two access terminals, the multicast controller is also configured to initiate a unicast flow based upon the determination by the server, in which the unicast flow includes push-to-media content, wherein a status change of at least one of the access terminals, as determined by the server, initiates the flow to be switched to the unicast flow, wherein the status change is associated with a predefined flow duration limit, the server is capable of extending the predefined duration limit by sending a duration extension request to the multicast controller.

19. The system of claim 18 in which the flow comprises a multicast flow.

20. The system of claim 18 in which the flow conforms to a published standard.

21. The system of claim 18 in which the multicast flow comprises a Broadcast and Multicast Services (BCMCS) flow.

22. The system of claim 18 further wherein the server determines if a unicast flow would be warranted.

23. The system of claim 18 further comprising:
an access terminal to access the flow for sending or receiving the push-to-media content.

24. The system of claim 18 wherein access to the flow is based, at least in part, upon a characteristic of the access terminal.

25. The system of claim 24 in which the characteristic of the access terminal comprises its location.

26. The system of claim 24 in which the characteristic of the access terminal comprises an association of the access terminal with a subscription service.

27. The system of claim 24 in which the characteristic of the access terminal comprises the access terminal being a member of a group.

28. The system of claim 18 in which the push-to-media content includes push-to-talk content.

29. The system of claim 18 in which the access terminal includes a cellular phone.

30. The system of claim 18 in which the access terminal includes a computing device.

31. A computer program product tangibly embodied in a storage device and bearing instructions to cause a machine to:
in response to an attempt by a first access terminal in a sector of a wireless network to provide push-to-media content to a second access terminal, transmit the push-to-media session content from the first access terminal using a flow to the second access terminal in which the flow is capable of transmitting the push-to-media content to at least two access terminals; the push-to-media content transmission is based, at least in part, on information provided by a push-to-media server and represents operational capability of the second access terminal, wherein a multicast controller, different from the push-to-media server, identifies the flow to the first and second access terminals; and
switch the flow to a unicast flow as determined by the push-to-media server based, at least in part, upon a status change of the second access terminal, wherein the status change is associated with a predefined flow duration limit, the push-to-media server is capable of extending the predefined duration limit by sending a duration extension request to the multicast controller.

32. The computer program product of claim 31 in which the flow comprises a multicast flow.

33. The computer program product of claim 31 in which the flow conforms to a published standard.

34. The computer program product of claim 31 in which the flow comprises a Broadcast and Multicast Services (BCMCS) flow.

35. The computer program product of claim 31 further comprising instructions to cause the machine to:
transmit the push-to-media content from the first access terminal using a unicast flow to a third access terminal.

36. The computer program product of claim 31 wherein transmitting the push-to-media content is based, at least in part, upon a characteristic of the second access terminal.

37. The computer program product of claim 36 in which the characteristic of the second access terminal comprises its location.

38. The computer program product of claim 36 in which the characteristic of the second access terminal comprises an association of the second access terminal with a subscription service.

39. The computer program product of claim 36 in which the characteristic of the second access terminal comprises the second access terminal being a member of a group.

40. The computer program product of claim 31 further comprising instructions to cause the machine to adjust access to the flow.

41. The computer program product of claim 40 in which adjusting access to the flow comprises granting access to the flow for a third access terminal.

42. The computer program product of claim 40 in which adjusting access to the flow comprises:
removing access for the second access terminal to the flow.

43. The computer program product of claim 31 wherein the push-to-media content includes push-to-talk content.

44. The computer program product of claim 31 in which the status change includes a decrease in membership of an access terminal group.

45. The computer program product of claim 31 in which the status change includes a location change of the second access terminal.

46. The computer program product of claim 31 further comprising instructions to cause the machine to:
switch the unicast flow to a second flow capable of transmitting the push-to-media content to at least two access terminals based, at least in part, upon a status change of the second access terminal.

47. The computer program product of claim 31 in which the status change includes an increase in membership of an access terminal group.

48. A system comprising:
a server to determine if establishing a Broadcast and Multicast Services (BCMCS) flow or a unicast flow would be warranted, wherein the BCMCS flow and the unicast flows are capable of transmitting push-to-media content, based, at least in part, on information stored on the server and represents operational capability of the at least two access terminals, the server is also configured to switch between the BMCS flow and the unicast flow based, at least in part, upon a status change of at least one of the two access terminals, wherein the status change is associated with a predefined flow duration limit, and
a multicast controller to initiate the BCMCS flow or the unicast flow based upon the determination by the server, wherein the flow includes the push-to-media content, wherein the multicast controller identifies the BCMCS flow or the unicast flow to the at least two access terminals, the server is capable of extending the predefined duration limit by sending a duration extension request to the multicast controller.

49. The system of claim 48 wherein access to the initiated flow is based, at least in part, upon a characteristic of an access terminal to receive the flow.

* * * * *

UNITED STATES PATENT AND TRADEMARK OFFICE
CERTIFICATE OF CORRECTION

PATENT NO.        : 8,130,686 B2
APPLICATION NO.   : 11/561523
DATED             : March 6, 2012
INVENTOR(S)       : Roshan M. Rao

Page 1 of 1

It is certified that error appears in the above-identified patent and that said Letters Patent is hereby corrected as shown below:

Column 13, Line 1, In Claim 22, delete "further wherein" and insert -- wherein --, therefor.

Column 14, Line 44, In Claim 48, delete "BMCS" and insert -- BCMCS --, therefor.

Signed and Sealed this
Eighth Day of May, 2012

David J. Kappos
*Director of the United States Patent and Trademark Office*